(No Model.)
B. F. MASON.
VEHICLE SEAT ATTACHMENT.
No. 462,265. Patented Nov. 3, 1891.
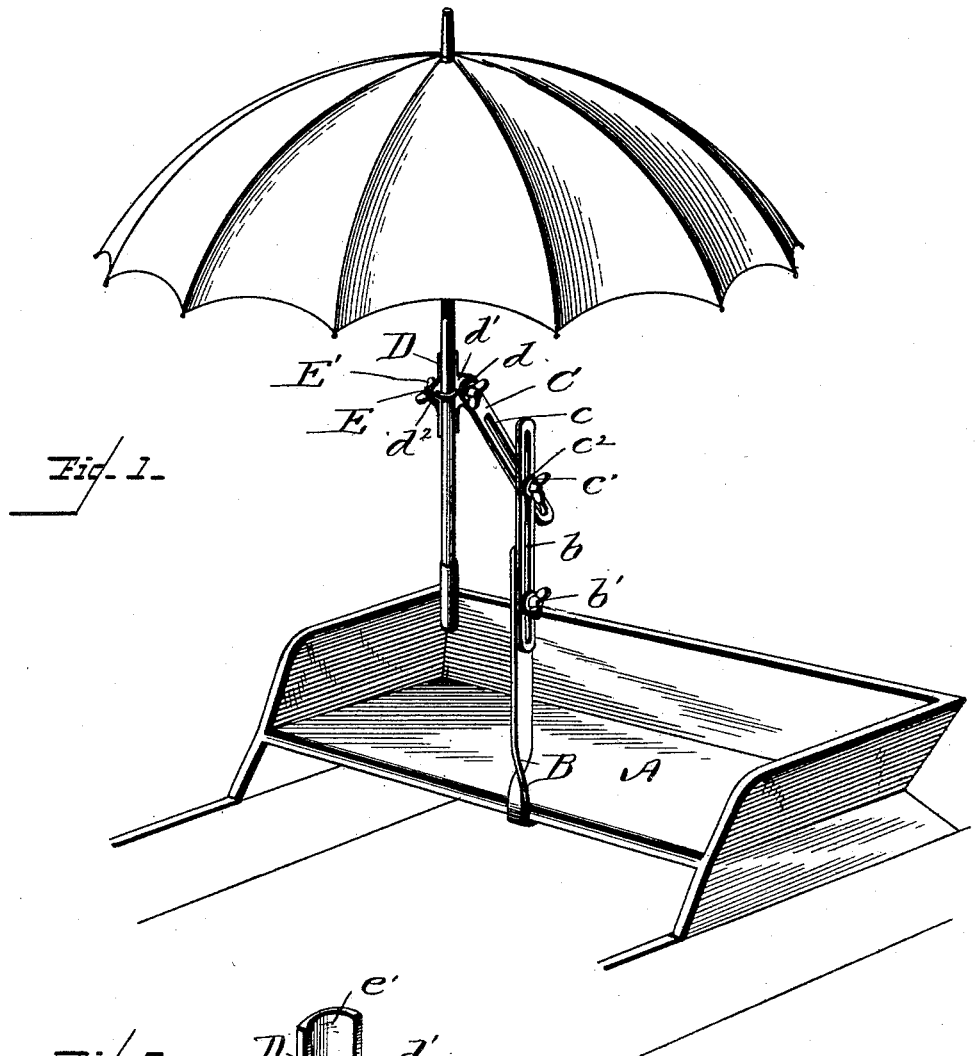
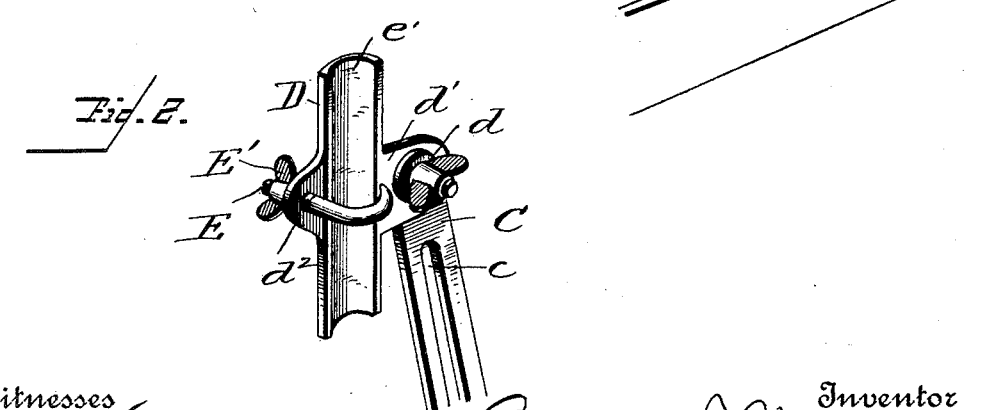
Witnesses
Inventor
Benjamin F. Mason
By his Attorney
Franklin H. Hough

UNITED STATES PATENT OFFICE.

BENJAMIN FRANKLIN MASON, OF ORANGE SPRINGS, FLORIDA.

VEHICLE-SEAT ATTACHMENT.

SPECIFICATION forming part of Letters Patent No. 462,265, dated November 3, 1891.

Application filed July 25, 1891. Serial No. 400,751. (No model.)

*To all whom it may concern:*

Be it known that I, BENJAMIN FRANKLIN MASON, a citizen of the United States, residing at Orange Springs, in the county of Marion and State of Florida, have invented certain new and useful Improvements in Vehicle-Seat Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in seat attachments for vehicles; and it has for its objects, among others, to provide a simple, cheap, efficient, and durable seat attachment designed primarily for holding umbrellas, which may be readily attached to a vehicle-seat and in which the parts may be readily adjusted to suit the varying circumstances under which it may be desired to use it. I provide an arm which is designed to be adjustably connected with the seat, and to this arm is adjustably connected another arm which carries a holder which is connected therewith by a pivot or swivel connection, so that it may be turned to any desired angle, so that the device may be adjusted to bring the umbrella at any desired angle dependent upon the direction in which the rain is falling, or for any other purpose. The various adjustments may be readily made from the seat without the occupants of the same moving from the seat, and they can be done so readily as not to subject the rider to the inconvenience of getting nearly wet through before he has made the necessary changes in position of the parts. The longitudinal adjustment provides for different styles and shapes of vehicles, so that the holder may be moved nearer to or farther from the seat.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a perspective view showing my improvement applied to a seat. Fig. 2 is a plan of the same detached.

Like letters of reference indicate like parts in both views where they occur.

Referring now to the details of the drawings by letter, A designates a seat of a vehicle of known construction.

B is an arm, which is designed to be secured to the under side of the seat in any well-known manner, preferably by being attached to a cleat or bar upon the under side thereof, although the inner end of this arm may be formed at right angles to its forward portion, so as to have a flat bearing against the under side of the seat. This may be accomplished by giving the arm a twist, which twist will also tend to strengthen the arm. This arm I prefer to make in two parts adjustable in any suitable manner—as, for instance, by forming the same with an elongated slot $b$, and the two parts held in their adjusted positions by a thumb-screw $b'$, working therein and arranged to clamp the two parts together by the turning up of the screw, as will be readily understood.

C is an arm which is provided with an elongated slot $c$. This arm is adjustably held to the arm B by means of a thumb-screw $c'$ and washers $c^2$, by which means the arms B and C may be lengthened or shortened, as occasion may require, and the arm C may also be turned on its thumb-screw as a pivot to bring the said arms in different positions and at different angles relatively to each other.

To the outer end of the arm C there is held by a pivot $d$ the holder D, which is formed with a lug or extension $d'$, through which the said pivot passes. The pivot is preferably a thumb-screw, so as to provide for ready adjustment of the holder relatively to the arm C. Upon the opposite edge of the holder there is a lug or extension $d^2$, through which passes the bolt E, which has one end curved or bent into substantially a semicircle, as seen in Fig. 1, to embrace the handle of the umbrella and the other end screw-threaded and receiving a nut E', by which it may be drawn up to hold the hooked or bent end around the handle of the umbrella.

The vertical portion of the holder is concaved, as shown at $e'$, for the reception of the umbrella-handle.

The manner of use will be readily understood and is illustrated in Fig. 1.

What I claim as new is—

An umbrella or shade support adapted to be attached to a seat and to be adjusted relatively thereto, consisting of an adjustable arm having a horizontal portion to extend beneath the seat, a twisted vertical portion, a second arm slotted and pivotally and adjustably carried thereby, a holder pivotally connected with the last-mentioned arm, and a bent hook or bolt passed through an extension of the holder and provided with an adjusting-nut, substantially as and for the purpose specified.

In testimony whereof I affix my signature in presence of two witnesses.

BENJAMIN FRANKLIN MASON.

Witnesses:
   C. A. LOPEZ,
   BERT D. HARRISON.